(12) United States Patent
Wei et al.

(10) Patent No.: US 8,259,228 B2
(45) Date of Patent: Sep. 4, 2012

(54) METHOD AND APPARATUS FOR HIGH QUALITY VIDEO MOTION ADAPTIVE EDGE-DIRECTIONAL DEINTERLACING

(75) Inventors: Jeff Wei, Richmond Hill (CA); David Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 1242 days.

(21) Appl. No.: 11/953,283

(22) Filed: Dec. 10, 2007

(65) Prior Publication Data

US 2009/0147133 A1 Jun. 11, 2009

(51) Int. Cl.
*H04N 11/20* (2006.01)
*G06K 9/32* (2006.01)

(52) U.S. Cl. .................. 348/452; 348/448; 382/300
(58) Field of Classification Search .......... 348/448–452; 382/300
See application file for complete search history.

(56) References Cited

U.S. PATENT DOCUMENTS

| | | | |
|---|---|---|---|
| 4,472,732 A | 9/1984 | Bennett et al. |
| 4,631,750 A | 12/1986 | Gabriel et al. |
| 4,669,100 A | 5/1987 | Slotboom et al. |
| 4,680,628 A | 7/1987 | Wojcik et al. |
| 4,740,842 A | 4/1988 | Annegam et al. |
| 4,750,057 A | 6/1988 | Baumeister |
| 4,800,436 A | 1/1989 | Polaert et al. |
| 4,868,655 A | 9/1989 | Choquet et al. |
| 4,881,125 A | 11/1989 | Krause |
| 4,908,874 A | 3/1990 | Gabriel |
| 4,941,045 A | 7/1990 | Birch |
| 4,947,251 A | 8/1990 | Hentschel |
| 4,982,280 A | 1/1991 | Lyon et al. |
| 4,989,090 A | 1/1991 | Campbell et al. |
| 4,992,982 A | 2/1991 | Steenhof |
| 4,998,153 A | 3/1991 | Kuyk et al. |
| 5,014,119 A | 5/1991 | Faroudja |
| 5,046,164 A | 9/1991 | Hurst, Jr. |

(Continued)

FOREIGN PATENT DOCUMENTS

EP 0690617 A2 1/1996

(Continued)

OTHER PUBLICATIONS

Le Gall; Compression Standard for Multimedia Applications; Association for Computing Machinery; vol. 34, No. 4; pp. 51-53, Apr. 1991.

(Continued)

*Primary Examiner* — Hoang-vu A Nguyen-ba
(74) *Attorney, Agent, or Firm* — Faegre Baker Daniels LLP

(57) ABSTRACT

A method for deinterlacing video includes constructing a temporary frame of deinterlaced video based on a first (i.e., current) field of interlaced video, wherein the temporary frame includes pixels in lines of the temporary frame associated with the first field of interlaced video, placeholder pixels in identified areas of motion in lines of the frame associated with a missing field of interlaced video, and pixels from an opposite field of polarity of interlaced video in areas without motion. The method further includes replacing the placeholder pixels in the identified areas of motion with pixels interpolated using an edge direction interpolation scheme based on pixels in the first field of interlaced video, resulting in a reconstructed frame. In one example, a motion adaptive interpolator may construct the temporary frame, and an edge directional interpolator may generate the reconstructed/deinterlaced the frame.

24 Claims, 6 Drawing Sheets

U.S. PATENT DOCUMENTS

| | | |
|---|---|---|
| 5,055,927 A | 10/1991 | Keesen et al. |
| 5,101,403 A | 3/1992 | Balzano |
| 5,128,791 A | 7/1992 | LeGall et al. |
| 5,134,480 A | 7/1992 | Wang et al. |
| 5,144,429 A | 9/1992 | Haghiri et al. |
| 5,151,783 A | 9/1992 | Faroudja |
| 5,159,451 A | 10/1992 | Faroudja et al. |
| 5,191,576 A | 3/1993 | Pommier et al. |
| 5,193,004 A | 3/1993 | Wang et al. |
| 5,233,421 A | 8/1993 | Chrisopher |
| 5,237,414 A | 8/1993 | Faroudja |
| 5,289,305 A | 2/1994 | Lake, Jr. |
| 5,305,104 A | 4/1994 | Jensen et al. |
| 5,327,240 A | 7/1994 | Golston et al. |
| 5,351,083 A | 9/1994 | Tsukagoshi |
| 5,408,270 A | 4/1995 | Lim |
| 5,428,398 A | 6/1995 | Faroudja |
| 5,436,663 A | 7/1995 | Guede |
| 5,467,138 A | 11/1995 | Gove |
| 5,488,419 A | 1/1996 | Hui et al. |
| 5,488,421 A | 1/1996 | Hwang et al. |
| 5,508,746 A | 4/1996 | Lim |
| 5,517,247 A | 5/1996 | Correa et al. |
| 5,521,644 A | 5/1996 | Sezan et al. |
| 5,532,750 A | 7/1996 | De Haan et al. |
| 5,596,371 A | 1/1997 | Pakhchyan et al. |
| 5,600,731 A | 2/1997 | Sezan et al. |
| 5,602,654 A | 2/1997 | Patti et al. |
| 5,619,272 A | 4/1997 | Salmon et al. |
| 5,621,470 A | 4/1997 | Sid-Ahmed |
| 5,621,481 A | 4/1997 | Yasuda et al. |
| 5,627,555 A | 5/1997 | den Hollander |
| 5,661,525 A | 8/1997 | Kovacevic et al. |
| 5,682,205 A | 10/1997 | Sezan et al. |
| 5,689,305 A | 11/1997 | Ng et al. |
| 5,724,098 A | 3/1998 | Murakami et al. |
| 5,754,248 A | 5/1998 | Faroudja |
| 5,774,593 A | 6/1998 | Zick et al. |
| 5,784,115 A | 7/1998 | Bozdagi |
| 5,793,435 A | 8/1998 | Ward et al. |
| 5,844,614 A | 12/1998 | Chong et al. |
| 5,864,369 A | 1/1999 | Swan |
| 5,929,913 A | 7/1999 | Etoh |
| 5,936,670 A | 8/1999 | Frencken |
| 5,943,099 A | 8/1999 | Kim |
| 5,995,154 A | 11/1999 | Heimburger |
| 6,037,986 A | 3/2000 | Zhang et al. |
| 6,118,486 A | 9/2000 | Reitmeier |
| 6,118,488 A | 9/2000 | Huang |
| 6,121,978 A | 9/2000 | Miler |
| 6,141,056 A | 10/2000 | Westerman |
| 6,188,437 B1 | 2/2001 | Webb et al. |
| 6,208,350 B1 | 3/2001 | Herrera |
| 6,239,842 B1 | 5/2001 | Segman |
| 6,266,092 B1 | 7/2001 | Wang et al. |
| 6,330,032 B1 | 12/2001 | Boehlke |
| 6,340,990 B1 | 1/2002 | Wilson |
| 6,370,198 B1 | 4/2002 | Washino |
| 6,392,706 B1 | 5/2002 | Sugiyama |
| 6,414,719 B1 | 7/2002 | Parikh |
| 6,437,828 B1 | 8/2002 | Chambers et al. |
| 6,456,329 B1 | 9/2002 | Tinker et al. |
| 6,459,454 B1 | 10/2002 | Walters |
| 6,459,455 B1 | 10/2002 | Jiang et al. |
| 6,473,460 B1 | 10/2002 | Topper |
| 6,487,304 B1 | 11/2002 | Szeliski |
| 6,549,240 B1 | 4/2003 | Reitmeier |
| 6,570,624 B2 | 5/2003 | Cornog et al. |
| 6,690,427 B2 | 2/2004 | Swan |
| 6,970,206 B1 | 11/2005 | Swan et al. |
| 7,218,355 B2 | 5/2007 | Zhou et al. |
| 2002/0054236 A1 | 5/2002 | Wredenhagen et al. |
| 2002/0075412 A1 | 6/2002 | Tang et al. |
| 2002/0101535 A1 | 8/2002 | Swan |
| 2003/0156301 A1 | 8/2003 | Kempf et al. |
| 2005/0078214 A1 | 4/2005 | Wong et al. |
| 2006/0023119 A1* | 2/2006 | Han .............................. 348/452 |
| 2009/0102966 A1* | 4/2009 | Jiang et al. .................... 348/448 |

FOREIGN PATENT DOCUMENTS

| | | |
|---|---|---|
| EP | 0739129 A2 | 10/1996 |
| EP | 1207693 A2 | 5/2002 |
| EP | 1515543 A2 | 3/2005 |
| JP | 10-322626 | 12/1998 |

OTHER PUBLICATIONS

ISO/IEC DIS 13818-2 Draft International Standard Information Technology—Generic coding of moving pictures and associated audio information—Part 2 Video, May 10, 1994, pp. 1-1.

A. Murat Tekalp, "Digital Video Processing," Chapter 16—Standards Conversion, pp. 302-330—1995.

European Search Report dated Mar. 28, 2006 for EP Application No. EP04255496, pp. 1-4.

Weinand, Lars, TV-Tuner and Videoschnitt: Ati All-In-Wonder RADEON 8500DV; from Tom's Hardware Guide (online); Dec. 11, 2001, pp. 1-2.

Weinand, Lars, Neue Mainstream-Klasse; Radeon 9000 (RV250), from Tom's Hardware Guide (online), Jul. 18, 2002, pp. 1-6.

ATI Technologies, White Paper Radeon Digital Video, from www.ati.com, Jun. 14, 2000, 20 pages.

Yoshida, Junko, Phillips new chip said to remove LCD TV artifacts*; EE Times, Jul. 8, 2003, pp. 1-2, www.eetimes.com/sys/OEG20030708S0017.

Bock, A.M., Motion-adaptive standards conversion between formats of similar field rates, Signal Processing Image Communication, Jul. 31, 1993, pp. 275-280.

Woods, John, W., et al., Hierarchical Motion Compensated De-interlacing; SPIE, Nov. 11, 1991, pp. 805-810.

De Haan, Gerard et al., Deinterlacing—An Overview; IEEE, Sep. 1998, vol. 86, No. 9, pp. 1839-1857.

European Search Report for EP Application No. EP05252564, Aug. 29, 2005.

Martinez, Dennis M. et al.; Spatial Interpolation of Interlaced Television Pictures; IEEE; 1989; pp. 1886-1889.

Bakker, P. et al.; Edge preserving orientation adaptive filtering; IEEE; 1999; pp. 535-540.

Tai, S.C. et al.; A Motion and Edge Adaptive Deinterlacing Algorithm; IEEE Int'l Conf. on Multimedia and Expo; 2004; pp. 659-662.

U.S. Appl. No. 11/467,978, entitled Method and Apparatus for Interpolating Image Information, filed Aug. 29, 2006.

* cited by examiner

METHOD AND APPARATUS FOR HIGH QUALITY VIDEO MOTION ADAPTIVE EDGE-DIRECTIONAL DEINTERLACING

FIELD OF THE INVENTION

This disclosure relates generally to methods and apparatus for deinterlacing interlaced video, and more particularly, to methods and apparatus that deinterlace video utilizing motion adaptive edge-directional techniques.

BACKGROUND OF THE INVENTION

Computer monitors are often non-interlaced or progressive type display devices, so video images or graphic images must be displayed by sequentially displaying each successive line or pixel data sequentially for a frame of an image. In contrast, interlaced display devices, such as conventional television displays, typically display images using even and odd line interlacing. The process of producing one progressive frame on every incoming interlaced field is called deinterlacing. In other words, deinterlacing is the process of converting a sequence of fields into a sequence of frames.

FIG. 1, for example, shows a first field 102 and a second field 104. The first field 102 contains the odd lines 106 through 110 and the second field 104 contains the even lines 112 through 116. Thus, an interlaced display device would first display the first field 102 and then the second field 104. Fields 102 and 104 are opposite fields, i.e., are of an opposite polarity (odd and even), and furthermore, they are consecutive fields, either forward or backward in time. Also shown in FIG. 1 is a deinterlaced frame 118, i.e., a reconstructed frame 118 having both odd lines 120-124 and even lines 126-130.

Because the sequential fields are different in time, however, creating a frame often requires temporal interpolation, especially when motion exists. Thus, for example, simply using odd lines 106-110 from field 102 and even lines 112-116 from field 104, assuming they are sequential fields, to create deinterlaced frame 118 would be problematic if motion exists.

As known in the art, this field to frame conversion, i.e., deinterlacing, may be done by using various known methods. For example, spatial methods use only the current field and are therefore memory efficient. One example of a spatial method is bobbing, which averages up and down pixels in the current field to interpolate the missing pixels. Thus, for example, if field 102 is the current field being used to construct deinterlaced frame 118, odd line 106 will be used to generate odd line 120, odd line 108 will be used to generate line 122, and line 110 will be used to generate line 124. Then, for example, to generate pixel 132 in even line 126, a missing line for this frame, of the deinterlaced frame 118, the method will average the values of pixel 134 and pixel 136 to produce an interpolated pixel 132.

In the line doubling method of spatial deinterlacing, the previous line in the current field is repeated. Thus, for example, in reconstructed frame 118, even line 126 would be a duplicate of odd line 120.

Bobbing and line doubling, however, may both suffer staircase effects (also known as "shredding") on areas that feature diagonal lines and edges. (Note, for example, an edge may occur where an abrupt change in pixel values exists.) Therefore, various edge-directional interpolation methods, which are also spatial methods of deinterlacing, exist to reduce or eliminate such adverse affects. Edge directional interpolation ("EDI") interpolates along the edge or line of the geometry of the current field. One common example of EDI is the edge line adaptive ("EDA") method. Using this technique, for example, the differences may be examined between two lines next to each other of a field. Interpolation may be done by selecting the two pixels that have the smallest difference and using the average of the two. Thus, the average may be from two pixels that are diagonal to each other, i.e., they are not directly up or down from each other. A more detailed example of an edge directional interpolation method is described in patent application Ser. No. 11/467,978, filed on Aug. 29, 2006 and having inventors Jeff Wei and Marinko Karanovic, which is hereby incorporated by reference in its entirety.

All spatial methods suffer reduced vertical resolution where the lost resolution was present in the missing pixels. This loss of resolution is especially apparent in still areas. When motion exists, the human eye has more difficulty processing all of the detail in motion areas, thereby making this lost resolution less noticeable in motion areas. In still areas, however, the human eye can more readily discern this loss of resolution.

Therefore, motion adaptive methods exist to restore lost resolution in still areas by retrieving (i.e., copying) the missing pixels from the opposite field and by using a spatial method in areas having motion. This technique of inserting an opposite field is effective because if there is not motion, inserting a previous or next field (by definition, of the opposite polarity) will recreate a perfect frame, i.e., there will be no data loss. As noted above, however, this method does not work well when there is motion. Therefore, motion adaptive methods use a spatial method of interpolation in areas, or for pixels, having detected motion.

Various motion detection methods are known to determine whether a missing pixel is still or in motion. In one example, pixels may be compared between one or more different fields to detect motion. In another example, a motion history may be generated. This particular method is detailed, for example, in U.S. Patent Publication No. 2005/0078214, entitled "Method and De-Interlacing Apparatus that Employs Recursively Generated Motion History Maps," published on Apr. 14, 2005, and having inventors Daniel W. Wong, Philip L. Swan, and Daniel Doswald. This publication is incorporated herein by reference in its entirety.

Thus, by using a motion adaptive method, if a missing pixel is determined to be still, the pixel will be copied from an opposite field; if the missing pixel is determined to be in motion, the pixel will be generated using a spatial method, such as one of the spatial methods discussed above or any other suitable method now known or later developed in the art. For example, with the motion compensated method, interpolation is performed along a motion trajectory. This, however, can be very expensive and has marginal quality improvement over other methods.

One relatively good motion adaptive method is the motion adaptive edge-directional method ("MAED"). This method results in high quality performance because still areas have full resolution and diagonal edges in motion areas are smooth. One known example of an integrated circuit 200 implementing motion adaptive edge-directional deinterlacing is shown in FIG. 2. Integrated circuit 200 may be a pixel shader (e.g., shader) and more specifically a programmable pixel shader, as known in the art. In this example current field data 202, pixels associated with other pixel information 204 (e.g., pixels from other fields or from a motion history map), and pixels from an opposite field 206 go into integrated circuit 200. Within integrated circuit 200, an edge direction interpolator receives current field data 202. Using a known edge directional interpolation method, such as one of the methods discussed above, the edge directional interpolator 208 generates edge directional interpolated information 210. Motion detector 212 may then use current field data 202 and pixels associated with other pixel information 204 (as discussed above) to generate motion detection information 214. Motion detector 212 may use any known method to detect areas of motion between fields, such as those discussed above. Motion detection information 214 indicates areas of motion between different fields, which may then be used to produce better interpolated pixels. Motion adaptive selector 216 then receives the edge directional interpolated information 210 and motion detection information 214, in addition to pixels from an opposite field 206. Then, based on the motion detection information 214, motion adaptive selector 216 generates (or constructs) a deinterlaced frame 218. For example, the motion adaptive selector will select the edge directional interpolated information 210 in areas where the motion detection information 214 indicates motion. Alternatively, if the motion detection information 214 indicates there is not motion, the motion adaptive selector selects pixels from an opposite field 206 to include in those areas of no motion in the deinterlaced frame 218. Thus, integrated circuit 200 implements a conventional method for motion adaptive edge-directional deinterlacing, as known in the art.

Conventional motion adaptive edge-directional deinterlacing methods, however, are not without their problems. For example, known solutions require dedicated hardware, which does not fully leverage the shader (and thus increases the area of silicon). Furthermore, using the shader for the entire motion adaptive edge-directional deinterlacing procedure consumes a lot of power, which is not always doable on low-end graphical processing units ("GPUs"). In some implementations, it requires too many instructions to deinterlace high quality video in real time. Therefore, a need exists for an apparatus and method for deinterlacing interlaced video, and more particularly for implementing motion adaptive edge-directional interpolation for deinterlacing video.

BRIEF DESCRIPTION OF THE DRAWINGS

The invention will be more readily understood in view of the following description when accompanied by the below figures and wherein like reference numerals represent like elements, wherein.

DETAILED DESCRIPTION OF THE PREFERRED EMBODIMENTS

Briefly, a method for deinterlacing video includes constructing a temporary frame of deinterlaced video based on a first (i.e., current) field of interlaced video, wherein the temporary frame includes pixels in lines of the temporary frame associated with the first field of interlaced video, placeholder pixels in identified areas of motion in lines of the frame associated with a missing field of interlaced video, and pixels from an opposite field of polarity of interlaced video in areas without motion. The method further includes replacing the placeholder pixels in the identified areas of motion with pixels interpolated using an edge direction interpolation scheme based on pixels in the first held of interlaced video, resulting in a reconstructed frame. In one example, a motion adaptive interpolator may construct the temporary frame, and an edge directional interpolator may generate the reconstructed/deinterlaced the frame.

In another example, the method and apparatus may include placeholder pixels that are either of a predetermined value (e.g., marker pixels) or that are interpolated pixels based on a simple spatial interpolation scheme, such as, for example, an edge line adaptive interpolation scheme.

Among other advantages, hardware, such as pixel shaders, may be better leveraged, which may, for example, allow the silicon size to decrease. Additionally, by applying the disclosed techniques, high quality deinterlaced video may be produced while consuming less power. As those skilled in the art will recognize, the disclosed subject matter may also allow the use of low-end GPUs (in addition to a dedicated circuit as described) to deinterlace high quality video in real time using a motion adaptive edge-directional method. Other advantages will be recognized by one of ordinary skill in the art.

Figure 1:
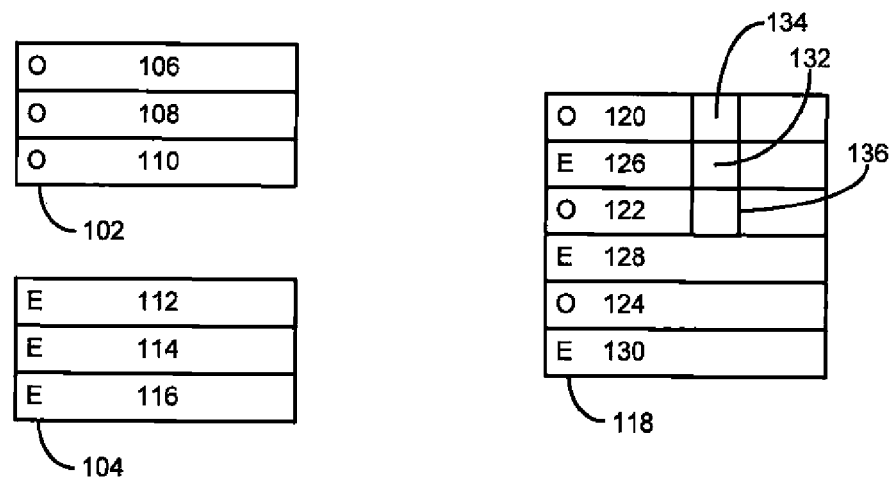
FIG. 1 is a diagram illustrating one example of a first field and a second field of an opposite polarity and a reconstructed or deinterlaced frame as known in the art.
Figure 2:
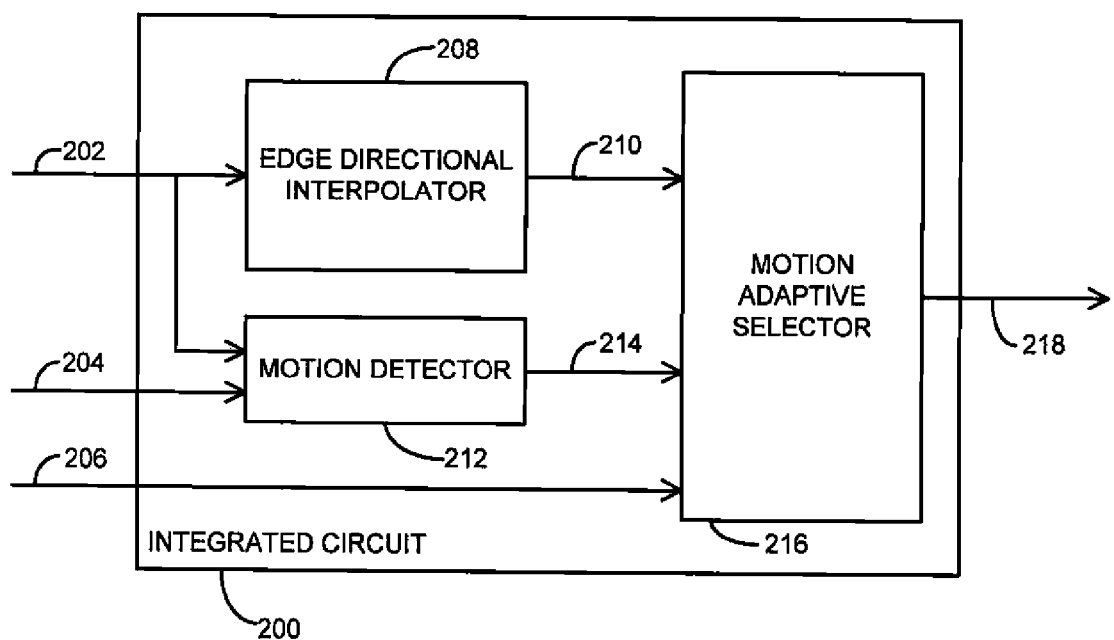
FIG. 2 is a block diagram illustrating one example of an integrated circuit for implementing motion adaptive edge-directional deinterlacing as known in the art.
Figure 3:
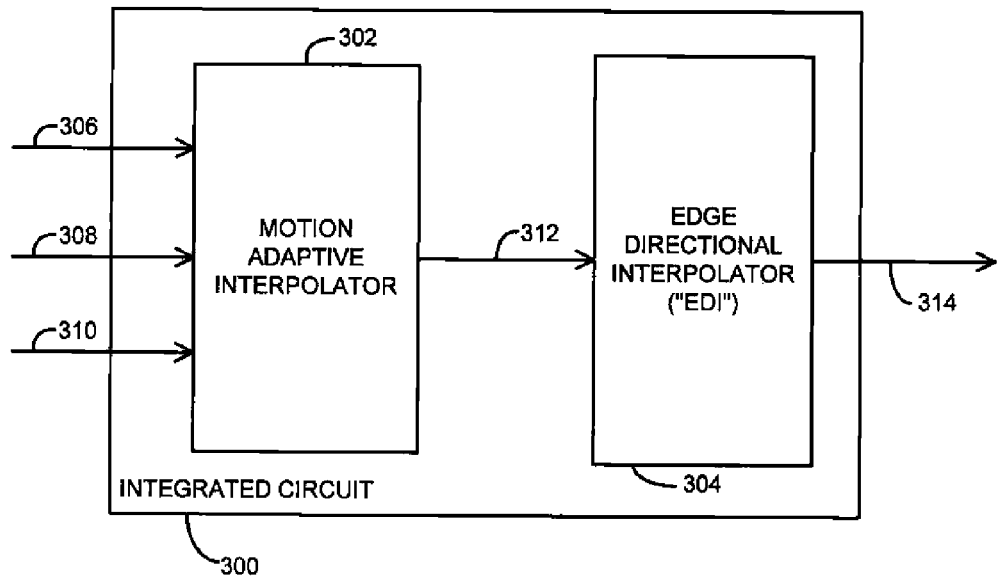
FIG. 3 is a block diagram of one example of an integrated circuit for deinterlacing video in accordance with one embodiment of the disclosure.

In FIG. 3, an integrated circuit 300 for deinterlacing video is shown. It is noted that the integrated circuit 300 may be on one die or on more than one die in any suitable manner. Integrated circuit 300 includes a motion adaptive interpolator 302 and an edge directional interpolator ("EDI") 304. The motion adaptive interpolator 302 is operative to receive pixels associated with a current field 306, pixels associated with other pixel information 308 (such as, for example, pixels from other fields or motion history information from a motion history map), and pixels from an opposite field of polarity 310. It is understood that this data, such as the pixels, may be from any suitable source, such as memory (not shown) or a decoder. Memory may be any type of memory conventionally known in the art, such as random access memory (RAM), read-only memory (ROM), programmable memory (PROM), erasable PROMs (EPROM), electrically erasable PROM (EEPROM), flash memory, magnetic storage devices (e.g., hard disks, floppy disks, magnetic tape), optical disc drives, or any other suitable non-volatile memory now known or later developed. It is further recognized that the memory may be distributed.

As is discussed in more detail below, the motion adaptive interpolator 302 is operative to generate a temporary frame 312 based on the pixels associated with the current field 306 and the pixels associated with the other pixel information 310. The edge directional interpolator 304 is operative to receive the temporary frame 312 and generate a reconstructed (i.e., deinterlaced) frame 314. It is noted that the edge directional interpolator 304, in one example, is a separate piece of hardware from the motion adaptive interpolator 302 and that the motion adaptive interpolator 302 may be a programmable pixel shader known in the art, although the edge directional interpolator 304 and the motion adaptive interpolator 302 may be on the same die if desired. Additionally, it is noted that although the terms temporary frame and reconstructed frame are used throughout, the integrated circuits and methods described within may be done on any suitable basis. As such, for example, the term "temporary frame" could mean portion of a temporary frame, such as a pixel, a tile of pixels, or any other suitable unit of information containing pixels associated with interlaced video that is desired to be converted to a deinterlaced format. In other words, a "frame" may not necessarily correspond to a full viewable frame on a display, although it is contemplated that a frame may also include this definition.

Temporary frame 312 includes pixels from a first field (i.e., current field) of interlaced video. For example, if a current field contains odd lines, the pixels from the first field of interlaced video would be those odd lines in the current field. As for the even lines in this particular example, those pixels would need to be interpolated. As such, the even lines (and thus the temporary frame) includes placeholder pixels in identified areas of motion in lines of the temporary frame with a missing field of interlaced video and pixels from an opposite field of polarity of interlaced video in areas without motion. It is understood that if the current field is of an even polarity, then the pixels from the field of interlaced video would be pixels forming the even lines and then the odd lines would be interpolated.

Figure 4:
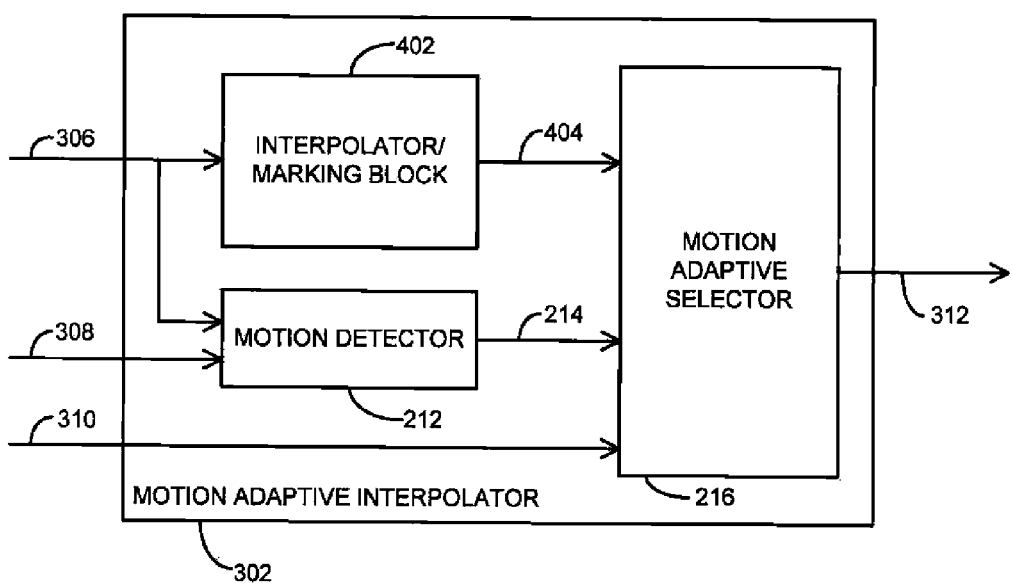
FIG. 4 is a block diagram of one example of a motion adaptive interpolator in accordance with one embodiment of the disclosure.

The temporary frame 312 is better understood in view of FIG. 4, which shows the motion adaptive interpolator 302. In one example, the motion adaptive interpolator 302 may be a low cost, programmable shader or SIMD, although any suitable circuit may be used. Motion adaptive interpolator includes an interpolator/marking block 402, a motion detector 212, and a motion adaptive selector 216. The interpolator/marking block 402 may be similar to the edge directional interpolator 208, but instead of performing edge directional interpolation, interpolator/marking block 402 either performs a simple spatial interpolation method (e.g., bob, line doubler, or any other suitable method) or inserts marker pixels. In either case, the interpolator/marking block 402 generates placeholder pixels 404. A marker pixel is any suitable pixel value, which may be selected arbitrarily and is generally consistent throughout the entire video. This marker may be selected, for example, with or without knowledge of surrounding pixels. Whether using placeholder pixels 404 that are generated by a simple spatial interpolation method or by using marker pixels, the placeholder pixels must be easily detectable in a second stage edge directional interpolator, as described below.

The edge directional interpolation method usually involves a lot of computation, and it is not always suitable or feasible for a low-end shader to perform in real time. Therefore, interpolator/marking block 402 performs a simple spatial interpolation method or simply inserts marker pixels to generate placeholder pixels 404.

Motion detector 212 may function by any suitable method as described above or as otherwise known in the art. The motion detector 212 receives pixels associated with a current field 306 and other pixel information 308 to generate motion detection information 214. The motion adaptive selector 216, in generating a temporary frame 312, then uses the motion detection information 214 to choose between placeholder pixels 404 in identified areas of motion in lines of the temporary frame associated with a missing field of interlaced video or pixels from an opposite field of polarity 310 of interlaced video in areas without motion. Thus, the temporary frame 312 includes current field pixels 306, placeholder pixels 404 (e.g., marked pixels or simple spatial generated pixels) in motion areas, and opposite field pixels 310 in still areas.

It is noted that as shown in the figures, pixels associated with the current field 306 do not go directly to the motion adaptive selector 216, yet the temporary frame 312 includes pixels from the current field 306. The motion adaptive selector 216 may receive the pixels associated with the current field 306 via any suitable means. For example, the interpolator/marking block 402 or the motion detector 212 may pass along the pixels associated with the current field 306 as part of temporary frame 312. Alternatively, the motion adaptive selector 216 may directly receive the pixels associated with the current field 306 (via a path not shown in the figures; i.e., this alternative is understood but not illustrated).

Turning back to FIG. 3, it is also noted that in another example embodiment, temporary frame 312 could be a temporary field instead of a frame. Stated another way, the temporary field 312 may contain placeholder pixels 404 and pixels from an opposite field of polarity 310 but not contain the pixels associated with the current field 306. Thus, temporary frame 312 could be a temporary field that contains only a reconstructed missing field, while the current field 306 would go from the original source (e.g., memory) directly to the edge directional interpolator 304. In this example, edge directional interpolator 304 is operative to receive temporary field 312 and pixels associated with a current field 306. Note that this data path is not shown in FIG. 3, but it is understood, for example, that the edge directional interpolator 304 may also receive pixels associated with a current field 306 to construct/generate reconstructed frame 314.

Figure 5:
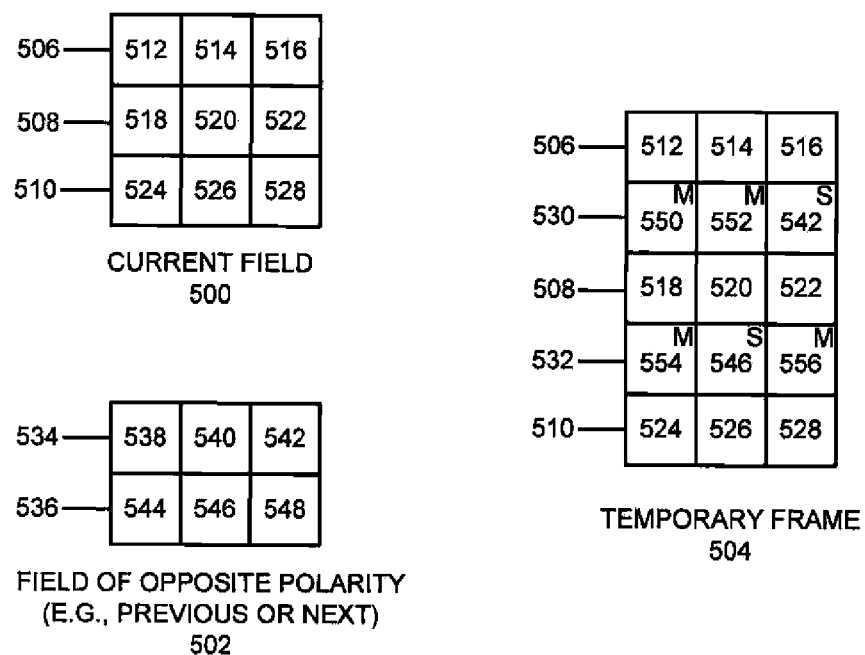
FIG. 5 is a diagram illustrating one example of a current field, a field of opposite polarity, and a temporary frame constructed in accordance with one embodiment of the disclosure.

FIG. 5 illustrates one example of a current field 500 (the odd lines), a previous field 502, which is of the opposite polarity (even lines), and one example of a temporary frame 504. The current field 500 has lines 506, 508, and 510. Line 506 has pixels 512, 514, 516; line 508 has pixels 518, 520, 522; and line 510 has pixels 524, 526, and 528. Temporary frame 504 includes these pixels 512-528, from the current field 500 of interlaced video, in lines of the temporary frame 504 associated with the first, current field 500 of interlace video. Thus, for example, temporary frame includes line 506 having pixels 512, 514, and 516; line 508 having pixels 518, 520, and 522; and line 510 having pixels 524, 526, and 528. Even lines 530 and 532 of temporary frame 504, however, must be interpolated, which may be done by motion adaptive interpolator 302 or any suitable hardware. For example, motion detector 212 may detect motion in some of the pixels in lines 530 and 532. The pixels that have detected motion are designated with the letter "M" while those that are detected to be still are designated with an "S." As described above, those areas not having motion may include a pixel from a previous field having an opposite polarity. Previous field 502 contains even lines 534 and 536. Even line 534 has pixels 538, 540, and 542, while even line 536 has pixels 544, 546, and 548. Thus, as shown, temporary frame 504 includes pixels 542 and 546 in the areas without motion because they are pixels from an opposite field of polarity. In the pixels with detected motion, however, the motion adaptive selector 216 will select placeholder pixels 404 from the interpolator/marking block 402. Thus, in one example, temporary frame 504 contains marker pixels 550, 552, 554, and 556. It is understood that these placeholder pixels 550-556 may be pixels generated by a simple spatial interpolation method instead of being marker pixels. In either case, edge directional interpolator 304 must be able to detect the placeholder pixels 550-556.

Figure 6:
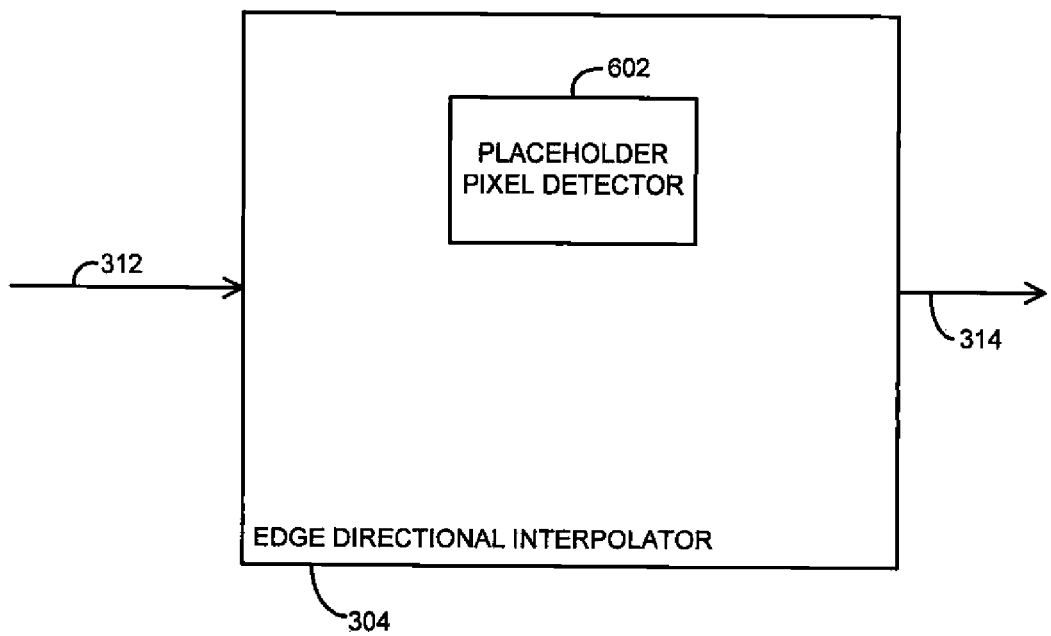
FIG. 6 is a block diagram of one example an edge directional interpolator having a placeholder pixel detector in accordance with one embodiment of the disclosure.

Turning to FIG. 6, one example of an edge directional interpolator 304 is shown. In one example, the edge directional interpolator 304 is a separate, dedicated circuit (or even dedicated hardware), which may be considered a "second stage" (whereas the motion adaptive interpolator may be thought of as a "first stage" and may be implemented with a low-end pixel shader as described above). As shown in FIG. 6, the edge directional interpolator 304 is operative to receive a temporary frame 312 and to generate a reconstructed frame 314 using any suitable edge directional interpolation method. For example, the edge directional interpolator may include an edge line adaptive interpolator (not shown) to perform edge line adaptive interpolation, as described above.

The edge directional interpolator 304 may contain a placeholder pixel detector 602, which is operative to detect placeholder pixels 404 that have been inserted in areas of detected motion so that the edge directional interpolator 304 may perform edge directional interpolation on these pixels. It is therefore understood that to detect placeholder pixels, additional data may need to be sent to the placeholder pixel detector 602. In one example, the placeholder pixel detector 602 detects placeholder pixels 550-556 only in the interpolated (or missing) lines of temporary frame 312. If marker values are used, placeholder pixels 550-556 are detected when the interpolated pixel has the same value as the marker value. If a simple spatial interpolation scheme was adopted in generating the placeholder pixels 550-556, the placeholder pixel detector 602 would use exactly the same scheme in producing a temporary interpolated value and compare this temporary value against the incoming interpolated value. If the two are equal, the interpolated pixel is regarded as the placeholder pixel. The placeholder pixel detector 602 can use exactly the same spatial interpolation scheme as in the interpolator/marking block 402 because it has access to the current field 306 since it is embedded in the incoming temporary frame 312.

Figure 7:
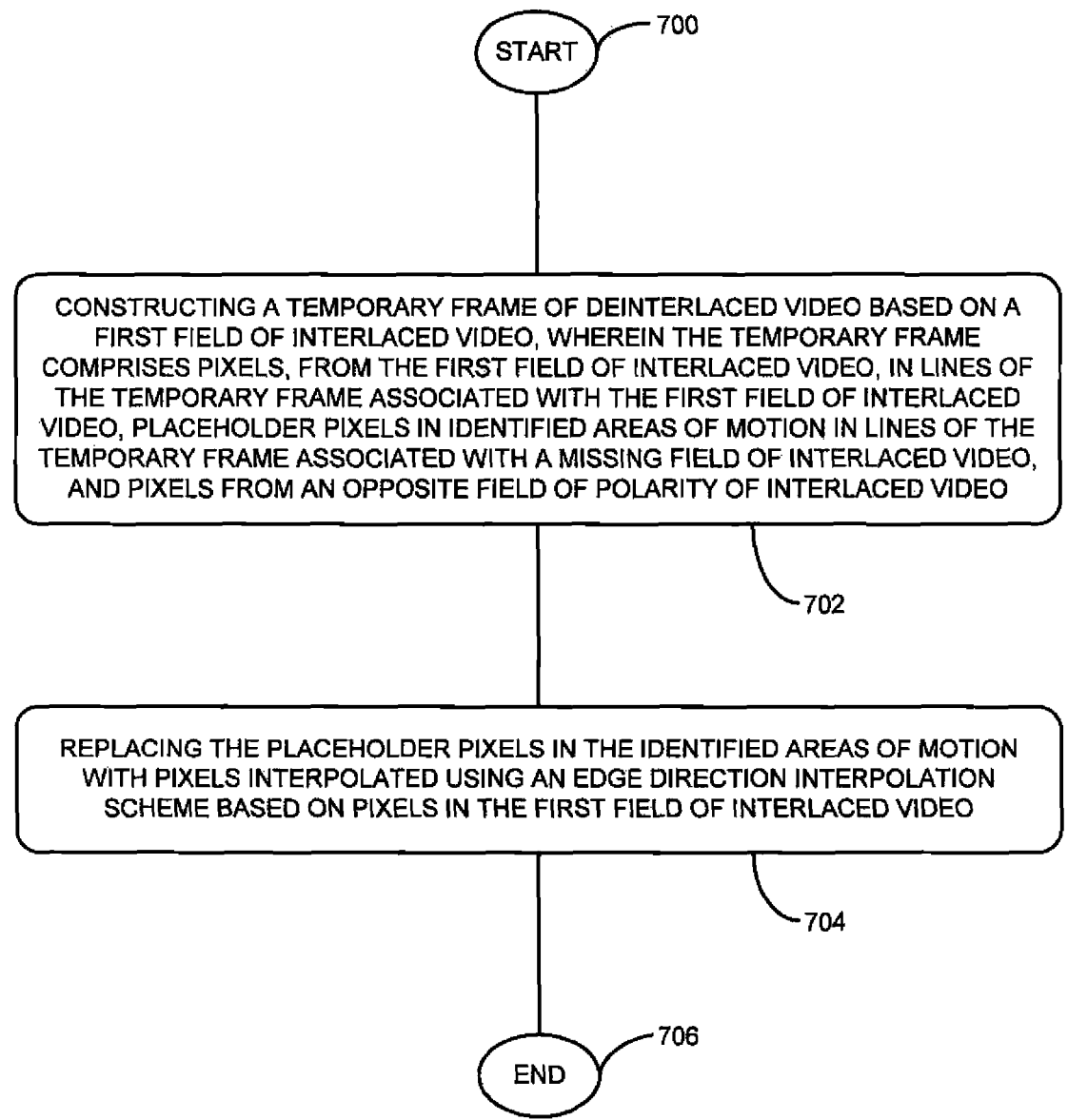
FIG. 7 is a flowchart illustrating one example of a method for deinterlacing video in accordance with one embodiment of the disclosure.

Turning to FIG. 7, a method for deinterlacing video is shown, starting in block 700. It is understood that this method may be performed by the integrated circuit 300 described above, and as such, the method may better be understood in view of the description above. Nonetheless, it is understood that the method may be implemented by any suitable hardware, integrated circuit, or other logic known in the art. It is also understood that the steps in the described methods may be performed in any suitable order and may further include any additional steps before, between, or after the described steps.

As shown in block 702, the method includes constructing temporary frame of deinterlaced video based on a first field of interlaced video, wherein the temporary frame comprises pixels, from the first field of interlaced video, in lines of the temporary frame associated with the first field of interlaced video, placeholder pixels in identified areas of motion in lines of the temporary frame associated with a missing field of interlaced video, and pixels from an opposite field of polarity of interlaced video in areas without motion. This step 702 may be performed, for example, by a motion adaptive interpolator 302, which may be a pixel shader. It is also understood that the pixels from the opposite field of polarity of interlaced video may be from fields that are previous or next in relation to the current (i.e., first) field.

Next, in block 704, the method includes replacing the placeholder pixels in the identified areas of motion with pixels interpolated using an edge direction interpolation scheme based on pixels in the first field of interlaced video. In one example, an edge directional interpolator 304 may perform this step to construct or generate a reconstructed frame 314. This reconstructed frame may be used in any suitable manner. For example, it may be stored in memory (such as a frame buffer) or may be used in an "on-the-fly" processing device or display device. It is also understood that further processing may be done at any suitable time during the method and may include operations such as compression, modulation, encoding, conversion, or any other suitable operation. In one example, the edge direction interpolation scheme may be a line adaptive interpolation scheme, as noted above.

As discussed above, the placeholder pixels may be of a predetermined value (marker pixels, as discussed above) or be interpolated pixels using a simple spatial interpolation method using pixels in the first field of interlaced video. Thus, for example, the pixels may be arbitrarily generated marker pixels (generally of a consistent value throughout the entire video, although this is not necessary) or may be generated using a technique such as bobbing, line doubling, or any other suitable simple spatial method, i.e., a method that requires less processing power to generate interpolated, placeholder pixels.

This example method ends as shown in block 706. As stated, however, the method may include any additional steps in any suitable order. For example, the method may also include identifying the placeholder pixels in the lines of the temporary frame associated with a missing field of interlaced video in the temporary frame.

Figure 8:
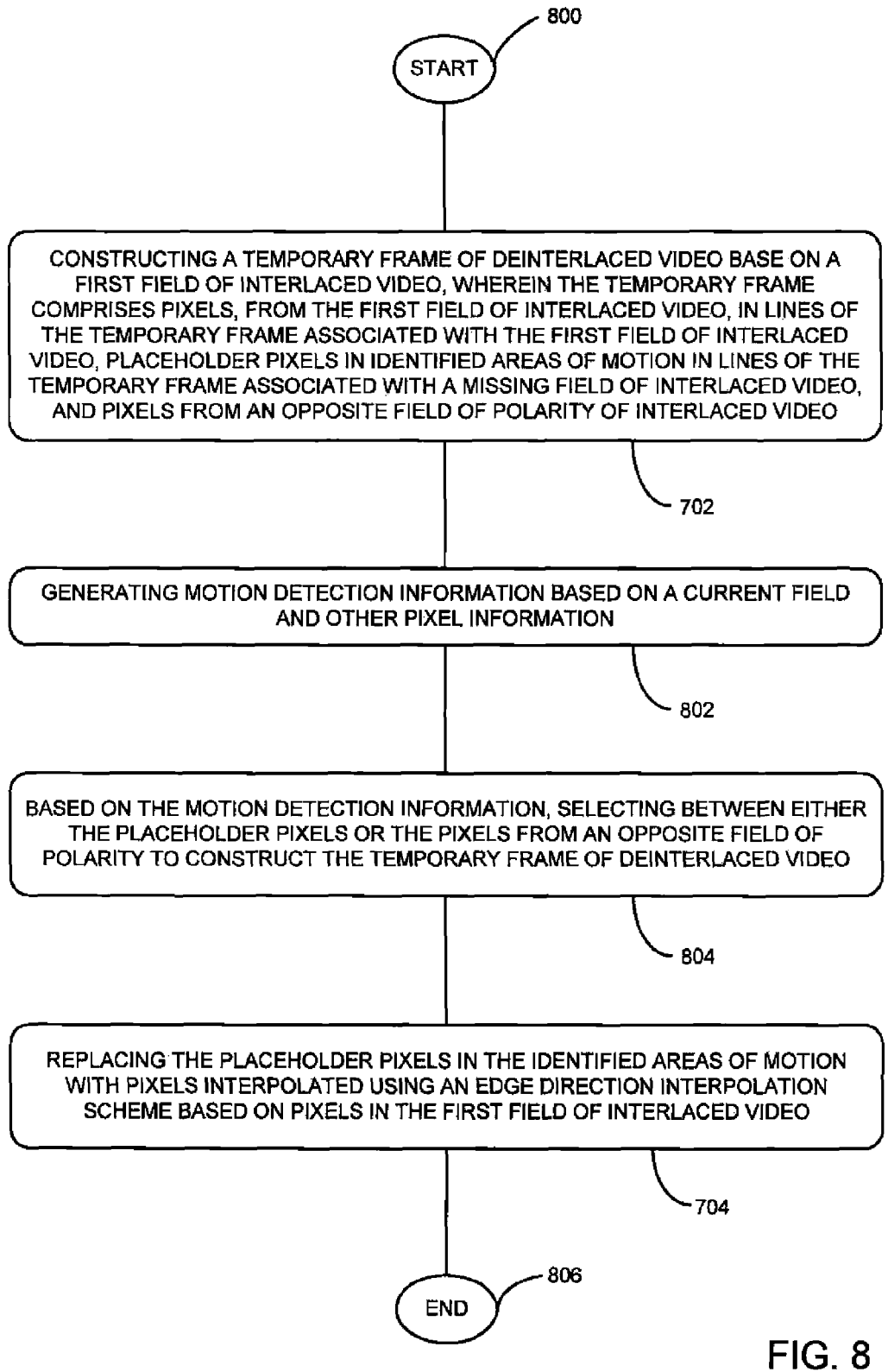
FIG. 8 is a flowchart illustrating one example of a method for deinterlacing video in accordance with one embodiment of the disclosure.

Another example method is shown in FIG. 8, starting in block 800 and including steps 702 and 704 in addition to the steps shown in blocks 802 and 804. After constructing a temporary frame 312, as shown in block 702, the method may include generating motion detection information based on a current field and other pixel information, as shown in block 802. This step may be performed, for example, by a motion detector 212 and may be done using any suitable method known in the art. Next, as shown in block 804, the method may include, based on the motion detection information, selecting between either the placeholder pixels or the pixels from an opposite field of polarity to construct the temporary frame of deinterlaced video. This step, in one example, may be performed by a motion adaptive selector 216, as described above. Then, as shown in block 704, the method may include replacing the placeholder pixels in the identified areas of motion with pixels interpolated using an edge direction interpolation scheme based on pixels in the first field of interlaced video. The method then ends as shown in block 806.

Figure 9:
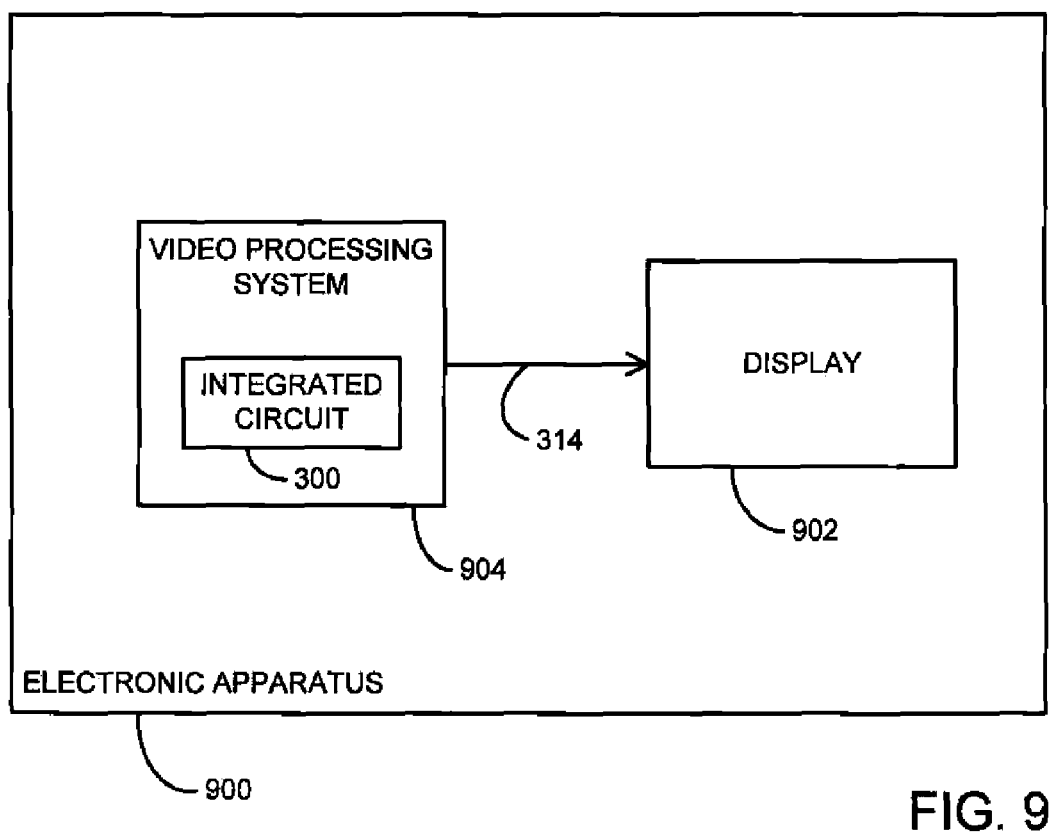
FIG. 9 is a block diagram illustrating one example of an electronic apparatus in accordance with one embodiment of the disclosure.

As one skilled in the art will appreciate, the disclosed subject matter may be used in any suitable application where deinterlacing video is desired (or required). For example, as shown in FIG. 9, an electronic apparatus 900 may include, among other things not shown, a display 902 and a video processing system 904, which may include integrated circuit 300 for deinterlacing video. The electronic apparatus 900 may be, for example, a digital TV, a laptop a desktop, a mobile device, or any other suitable device. The video processing system 904, besides including integrated circuit 300, may include any suitable circuits or other components, such as GPUs, frame buffers, memory, digital signal processors ("DSPs"), SIMD engines, programmable logics such as FPGA, combinations of various logics, processors or engines, or any other suitable logic used in a video processing system. The integrated circuit 300 may be implemented as discussed above and ultimately generates a reconstructed frame 314. This reconstructed frame may eventually be used to display an image on display 902, either "on-the-fly" or after being stored in memory, such as a frame buffer (not shown).

Thus, among other advantages, hardware, such as pixel shaders, may be better leveraged, which may, for example, allow the silicon size to decrease. Additionally, by applying the disclosed techniques, high quality deinterlaced video may be produced while consuming less power. As those skilled in the art will recognize, the disclosed subject matter may also allow the use of low-end GPUs (in addition to a dedicated circuit as described) to deinterlace high quality video in real time using a motion adaptive edge-directional method.

The above detailed description of the disclosure and the examples described herein have been presented for the purposes of illustration and description only and not by limitation. It is therefore contemplated that the present disclosure cover any and all modifications, variations or equivalents that fall within the spirit and scope of the basic underlying principles disclosed above and claimed herein. For example, as one skilled in the art will appreciate, the techniques described above, although referring to a temporary "frame" and a reconstructed "frame," may be performed on a pixel by pixel basis, a group of pixel basis, a full viewable frame basis, or any other suitable pixel grouping. Additionally, as one skilled in the art will appreciate, there are various other techniques and methods for interpolating missing pixels while deinterlacing video that are not discussed, yet those deinterlacing methods may be applied in view of the disclosed subject matter and fall within the scope and spirit of the disclosure.

What is claimed is:

1. A method for deinterlacing video comprising:
constructing a temporary frame of deinterlaced video based on a first field of interlaced video, wherein the temporary frame comprises pixels, from the first field of interlaced video, in lines of the temporary frame associated with the first field of interlaced video, placeholder pixels in identified areas of motion in lines of the temporary frame associated with a missing field of interlaced video, and pixels from an opposite field of polarity of interlaced video in areas without motion; and
replacing the placeholder pixels in the identified areas of motion with pixels interpolated using an edge direction interpolation scheme based on pixels in the first field of interlaced video.

2. The method of claim 1, wherein the placeholder pixels are one of:
a predetermined value; and
interpolated pixels using a spatial interpolation method using pixels in the first field of interlaced video.

3. The method of claim 1 further including:
identifying the placeholder pixels in the lines of the temporary frame associated with a missing field of interlaced video in the temporary frame.

4. The method of claim 1 wherein the edge directional interpolation scheme is an edge line adaptive interpolation scheme.

5. The method of claim 1 further comprising:
generating motion detection information based on a current field and other pixel information; and
based on the motion detection information, selecting between either the placeholder pixels or the pixels from an opposite field of polarity to construct the temporary frame of deinterlaced video.

6. An integrated circuit for deinterlacing video comprising:
a motion adaptive interpolator operative to receive pixels associated with a current field and pixels associated with other pixel information, the motion adaptive interpolator operative to generate a temporary frame based on the pixels for the current field and the pixels associated with the other pixel information; and
an edge directional interpolator operative to receive the temporary frame and generate a reconstructed frame.

7. The integrated circuit of claim 6, wherein the temporary frame comprises:
pixels, from a first field of interlaced video, in lines of the temporary frame associated with a first field of interlaced video;
placeholder pixels in identified areas of motion in lines of the temporary frame associated with a missing field of interlaced video; and
pixels from an opposite field of polarity of interlaced video in areas without motion.

8. The integrated circuit of claim 7, wherein the placeholder pixels in identified areas of motion in lines of the temporary frame are marker pixels.

9. The integrated circuit of claim 7, wherein the edge directional interpolator includes a placeholder pixel detector operative to detect the placeholder pixels in identified areas of motion in lines of the temporary frame.

10. The integrated circuit of claim 6 wherein the edge directional interpolator includes an edge line adaptive interpolator.

11. An integrated circuit for deinterlacing video comprising:
a motion adaptive interpolator operative to receive pixels associated with a current field and pixels associated with other pixel information, the motion adaptive interpolator operative to generate a temporary frame based on the pixels for the current field and the pixels associated with the other pixel information; and
an edge directional interpolator operative to receive the temporary frame and generate a reconstructed frame;
wherein the motion adaptive interpolator is a pixel shader; and
wherein the edge directional interpolator is a dedicated circuit separate from the pixel shader.

12. The integrated circuit of claim 11, wherein the temporary frame comprises:
pixels, from a first field of interlaced video, in lines of the temporary frame associated with a first field of interlaced video;
placeholder pixels in identified areas of motion in lines of the temporary frame associated with a missing field of interlaced video; and
pixels from an opposite field of polarity of interlaced video in areas without motion.

13. The integrated circuit of claim 12, wherein the edge directional interpolator includes a placeholder pixel detector operative to detect the placeholder pixels in identified areas of motion in lines of the temporary frame.

14. The integrated circuit of claim 12, wherein the edge directional interpolator includes an edge line adaptive interpolator.

15. An electronic apparatus comprising:
a display; and
a video processing system comprising an integrated circuit comprising:
a motion adaptive interpolator operative to receive pixels associated with a current field and pixels associated with other pixel information, the motion adaptive interpolator operative to generate a temporary frame based on the pixels for the current field and the pixels associated with the other pixel information; and
an edge directional interpolator operative to receive the temporary frame and generate a reconstructed frame.

16. The electronic apparatus of claim 15, wherein the temporary frame comprises:
- pixels, from a first field of interlaced video, in lines of the temporary frame associated with a first field of interlaced video;
- placeholder pixels in identified areas of motion in lines of the temporary frame associated with a missing field of interlaced video; and
- pixels from an opposite field of polarity of interlaced video in areas without motion.

17. The electronic apparatus of claim 16, wherein the edge directional interpolator includes a placeholder pixel detector operative to detect the placeholder pixels in identified areas of motion in lines of the temporary frame.

18. A method for deinterlacing video comprising:
- constructing a temporary field of deinterlaced video based on a first field of interlaced video, wherein the temporary field comprises placeholder pixels in identified areas of motion in lines of the temporary field associated with a missing field of interlaced video and pixels from an opposite field of polarity of interlaced video in areas without motion; and
- replacing the placeholder pixels in the identified areas of motion with pixels interpolated using an edge direction interpolation scheme based on pixels in the first field of interlaced video.

19. The method of claim 18, wherein the placeholder pixels are one of:
- a predetermined value; and
- interpolated pixels using a spatial interpolation method using pixels in the first field of interlaced video.

20. The method of claim 18 further comprising:
- generating motion detection information based on a current field and other pixel information; and
- based on the motion detection information, selecting between either the placeholder pixels or the pixels from an opposite field of polarity to construct the temporary field of deinterlaced video.

21. An integrated circuit for deinterlacing video comprising:
- a motion adaptive interpolator operative to receive pixels associated with a current field and pixels associated with other pixel information, the motion adaptive interpolator operative to generate a temporary field based on the pixels for the current field and the pixels associated with the other pixel information; and
- an edge directional interpolator operative to receive the temporary field, to receive the pixels associated with the current field, and to generate a reconstructed frame.

22. The integrated circuit of claim 21, wherein the temporary field comprises:
- placeholder pixels in identified areas of motion in lines of the temporary field associated with a missing field of interlaced video; and
- pixels from an opposite field of polarity of interlaced video in areas without motion.

23. The integrated circuit of claim 22, wherein the placeholder pixels in identified areas of motion in lines of the temporary field are marker pixels.

24. The integrated circuit of claim 22, wherein the edge directional interpolator includes a placeholder pixel detector operative to detect the placeholder pixels in identified areas of motion in lines of the temporary field.

* * * * *